US010462223B2

(12) United States Patent
Varma et al.

(10) Patent No.: US 10,462,223 B2
(45) Date of Patent: Oct. 29, 2019

(54) METHOD AND SYSTEM FOR DATA COMMUNICATION

(71) Applicant: Bank of America Corporation, Charlotte, NC (US)

(72) Inventors: Jayachandra Varma, Irving, TX (US); Manu Kurian, Dallas, TX (US); Albena N. Fairchild, Spruce Pine, NC (US); Dimitra J. Tsagris, Antioch, CA (US); Ganesh Bonda, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 146 days.

(21) Appl. No.: 15/833,551

(22) Filed: Dec. 6, 2017

(65) Prior Publication Data
US 2019/0173946 A1   Jun. 6, 2019

(51) Int. Cl.
*G06F 15/16* (2006.01)
*H04L 29/08* (2006.01)
*G06N 3/04* (2006.01)
*G06N 3/08* (2006.01)

(52) U.S. Cl.
CPC ........... *H04L 67/1097* (2013.01); *G06N 3/04* (2013.01); *G06N 3/08* (2013.01)

(58) Field of Classification Search
USPC ....... 709/203, 206, 217, 219, 223, 224, 226, 709/228, 230, 232, 238; 706/52
See application file for complete search history.

(56) References Cited

U.S. PATENT DOCUMENTS

| 5,862,223 | A | 1/1999 | Walker et al. |
|---|---|---|---|
| 7,324,966 | B2 | 1/2008 | Scheer |
| 7,437,703 | B2 | 10/2008 | Wu |
| 7,958,067 | B2 | 6/2011 | Schmidtler et al. |
| 8,239,229 | B1 | 8/2012 | Paiz |
| 8,315,900 | B2 | 11/2012 | Schwarz et al. |
| 8,355,963 | B2 | 1/2013 | Sicard |
| 8,386,325 | B2 | 2/2013 | Bock et al. |
| 8,401,908 | B2 | 3/2013 | Bildmayer et al. |
| 8,738,476 | B2 | 5/2014 | Wocher et al. |
| 8,818,884 | B2 | 8/2014 | Marschall et al. |

(Continued)

*Primary Examiner* — Quang N Nguyen
(74) *Attorney, Agent, or Firm* — Banner & Witcoff, Ltd.; Michael A. Springs

(57) ABSTRACT

Aspects of the present disclosure are directed to electronic computer implemented methods of data communication. The method includes receiving a plurality of virtual nodes with EDI data payload including a node attribute, a GPS location attribute and a biometric ID attribute and at least one data element associated with the GPS location attribute. In further aspect, the method includes electronically via a data communications network, processing the EDI data payloads including the node attribute, the GPS location attribute and the biometric ID attribute and the at least one data element associated with the GPS location attribute. Then, electronically processing the EDI data payloads in a network with machine learning and providing an electronic message responsive thereto. In yet a further aspect, the data communications method includes a step of processing the smart data set in the network with machine learning and providing an electronic message responsive thereto.

3 Claims, 10 Drawing Sheets

(56) References Cited

U.S. PATENT DOCUMENTS

| | | | |
|---|---|---|---|
| 9,298,806 B1 | 3/2016 | Vessenes et al. | |
| 9,396,388 B2 | 7/2016 | Amtrup et al. | |
| 9,397,985 B1 | 7/2016 | Seger, II et al. | |
| 2012/0303573 A1* | 11/2012 | Pan | G06N 7/005 |
| | | | 706/52 |
| 2016/0261404 A1 | 9/2016 | Ford et al. | |
| 2016/0292680 A1 | 10/2016 | Wilson, Jr. et al. | |
| 2017/0140375 A1 | 5/2017 | Kunstel | |
| 2017/0178237 A1 | 6/2017 | Wong | |
| 2017/0373930 A1* | 12/2017 | Danilov | H04L 67/1097 |
| 2019/0013948 A1* | 1/2019 | Mercuri | G06Q 20/02 |
| 2019/0109714 A1* | 4/2019 | Clark | H04L 9/3226 |
| 2019/0109821 A1* | 4/2019 | Clark | H04L 63/0236 |

\* cited by examiner

METHOD AND SYSTEM FOR DATA COMMUNICATION

BACKGROUND

Moore's law predicted that the number of transistors on a computer chip would double every two years while the chip's price would remain constant. "Moore's law" meant consumers could buy the same technology two years later for about the same price. Fifty years later, Moore's law prediction has endured to the idea that technology companies have recognized Moore's law as a benchmark they must meet, or fall behind in the market. Patrons have come to expect technological products to be faster, cheaper, and more compact over time. This expectation seems to have driven trends of rapid growth in computing power, smaller devices, the ability to connect to the Internet, and reduction in cost and big data. There is a need to improve the technological processing in the new computing era.

SUMMARY

In light of the foregoing background, the following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

Aspects of the present disclosure are directed to electronic computer implemented methods of data communication. In one aspect, the method includes, via a computer-based network, receiving a plurality of virtual nodes with EDI data payload including a node attribute, a GPS location attribute and a biometric ID attribute and at least one data element associated with the GPS location attribute. In further aspect, the method includes electronically via a data communications network, processing the EDI data payloads including the node attribute, the GPS location attribute and the biometric ID attribute and the at least one data element associated with the GPS location attribute. Then electronically processing the EDI data payloads in a network with machine learning and providing an electronic message responsive thereto. In yet further aspects, includes a step of transmitting via an EDI data payload the electronic message to a device associated with the biometric ID attribute. In yet a further aspect, the method includes outputting a subset of the EDI data payloads to define a smart data set. In yet a further aspect, the data communications method includes a step of processing the smart data set in the network with machine learning and providing an electronic message responsive thereto.

Aspects of the present disclosure are directed a digital computer system, comprising: at least one computer readable database configured to maintain a plurality of computer readable nodes; and at least one computing device, operatively connected to the at least one computer readable database, configured to: electronically receive a plurality of virtual nodes with EDI data payload including a node attribute, a GPS location attribute and a biometric ID attribute and at least one data element associated with the GPS location attribute; electronically process the EDI data payloads including the node attribute, the GPS location attribute and the biometric ID attribute and the at least one data element associated with the GPS location attribute; and electronically process the EDI data payloads in a network with machine learning and providing an electronic message responsive thereto.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

A more complete understanding of aspects of the present disclosure and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments in which the disclosure may be practiced. It is to be understood that other embodiments may be utilized and structural and functional modifications may be made.

Figure 1:
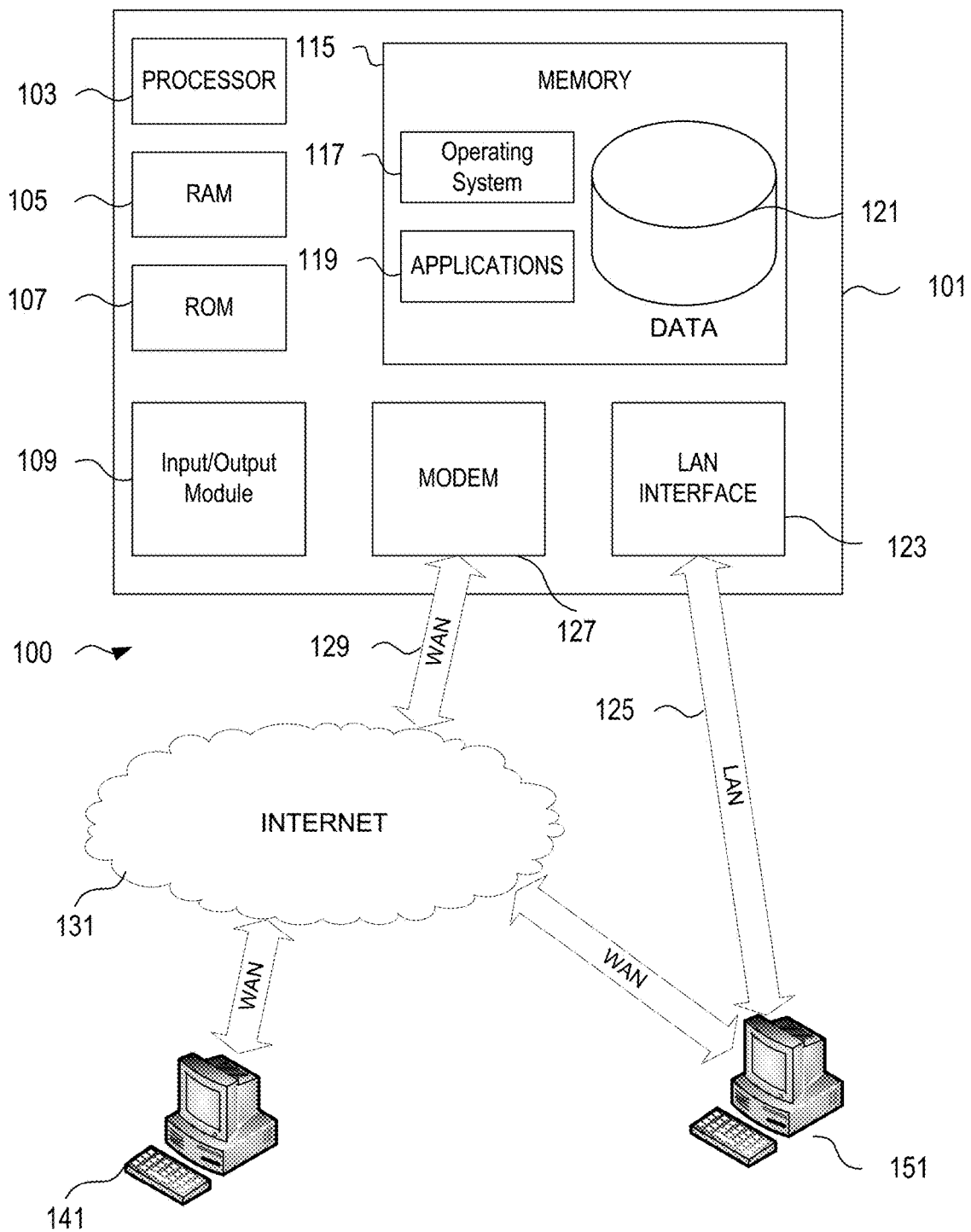
FIG. 1 illustrates a schematic diagram of a digital computing environment in which certain aspects of the present disclosure may be implemented.

FIG. 1 illustrates a block diagram of an specific programmed computing device 101 (e.g., a computer server) that may be used according to an illustrative embodiment of the disclosure. The computer server 101 may have a processor 103 for controlling overall operation of the server and its associated components, including RAM 105, ROM 107, input/output module 109, and memory 115.

Input/Output (I/O) 109 may include a microphone, keypad, touch screen, camera, and/or stylus through which a user of device 101 may provide input, and may also include one or more of a speaker for providing audio output and a video display device for providing textual, audiovisual and/or graphical output. Other I/O devices through which a user and/or other device may provide input to device 101 also may be included. Software may be stored within memory 115 and/or storage to provide computer readable instructions to processor 103 for enabling server 101 to perform various technologic functions. For example, memory 115 may store software used by the server 101, such as an operating system 117, application programs 119, and an associated database 121. Alternatively, some or all of server 101 computer executable instructions may be embodied in hardware or firmware (not shown). As described in detail below, the database 121 may provide centralized storage of characteristics associated with vendors and patrons, allowing functional interoperability between different elements located at multiple physical locations.

The server 101 may operate in a networked environment supporting connections to one or more remote computers, such as terminals 141 and 151. The terminals 141 and 151 may be personal computers or servers that include many or all of the elements described above relative to the server 101. The network connections depicted in FIG. 1 include a local area network (LAN) 125 and a wide area network (WAN) 129, but may also include other networks. When used in a LAN networking environment, the computer 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed.

Computing device 101 and/or terminals 141 or 151 may also be mobile terminals including various other components, such as a battery, speaker, and antennas (not shown).

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, mobile computing devices, e.g., smart phones, wearable computing devices, tablets, distributed computing environments that include any of the above systems or devices, and the like.

The disclosure may be described in the context of computer-executable instructions, such as program modules, being executed by a computer. Generally, program modules include routines, programs, objects, components, data structures, etc. that perform particular tasks or implement particular computer data types. The disclosure may also be practiced in distributed computing environments where tasks are performed by remote processing devices that are linked through a communications network. In a distributed computing environment, program modules may be located in both local and remote computer storage media including memory storage devices.

Figure 2:
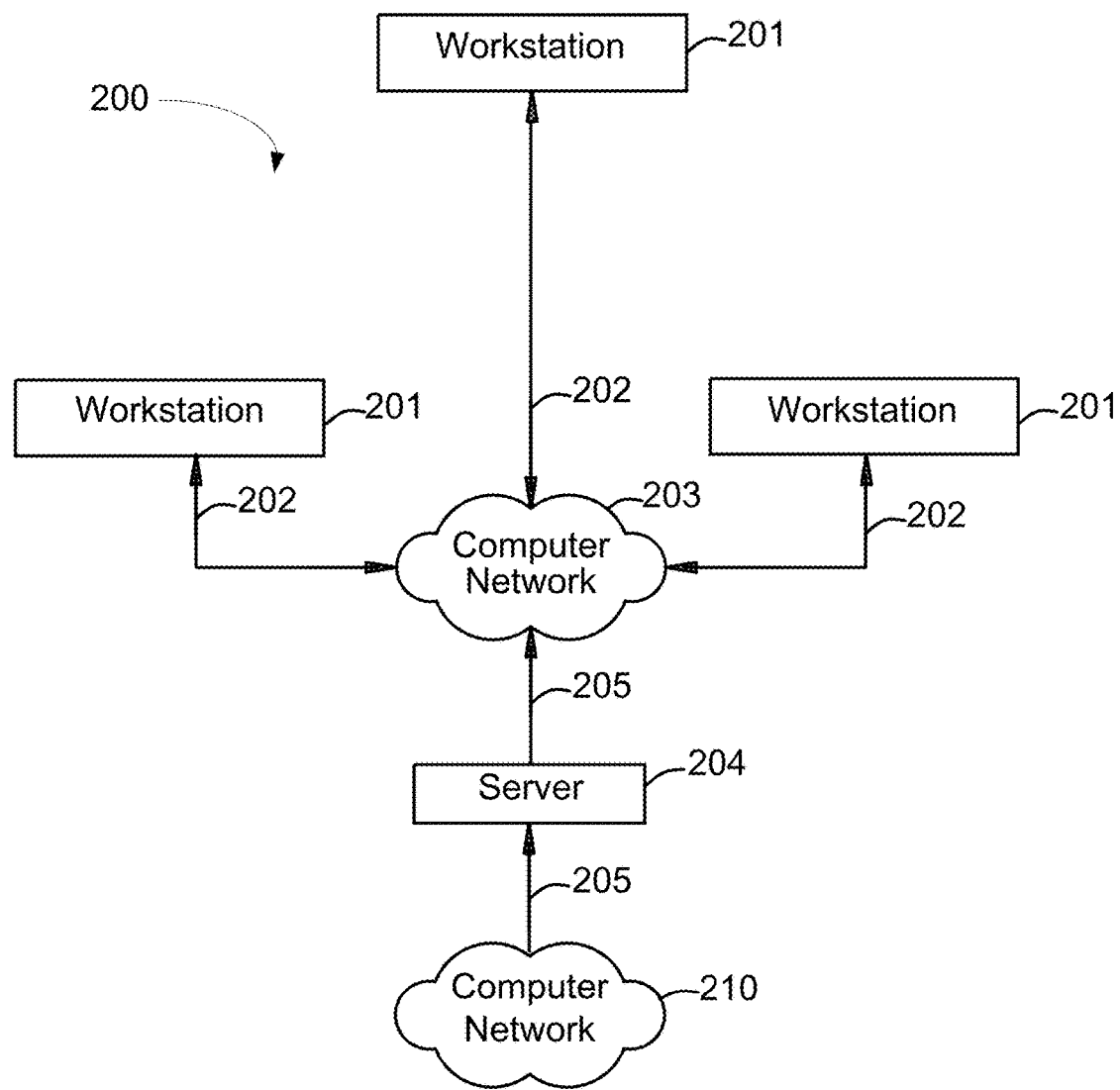
FIG. 2 is an illustrative block diagram of workstations and servers that may be used to implement the processes and functions of certain embodiments of the present disclosure.

Referring to FIG. 2, an illustrative system 200 for implementing methods according to the present disclosure is shown. As illustrated, system 200 may include one or more workstations 201. Workstations 201 may be local or remote, and are connected by one or more communications links 202 to computer networks 203, 210 that is linked via communications links 205 to server 204. In system 200, server 204 may be any suitable server, processor, computer, or data processing device, or combination of the same. Computer networks 203, 201 may incorporate various machine intelligence (MI) neutral network 303 (see FIG. 3A) features of available Tensorflow or Neuroph software development platforms (which are incorporated by reference herein).

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, etc.

Figure 3A:
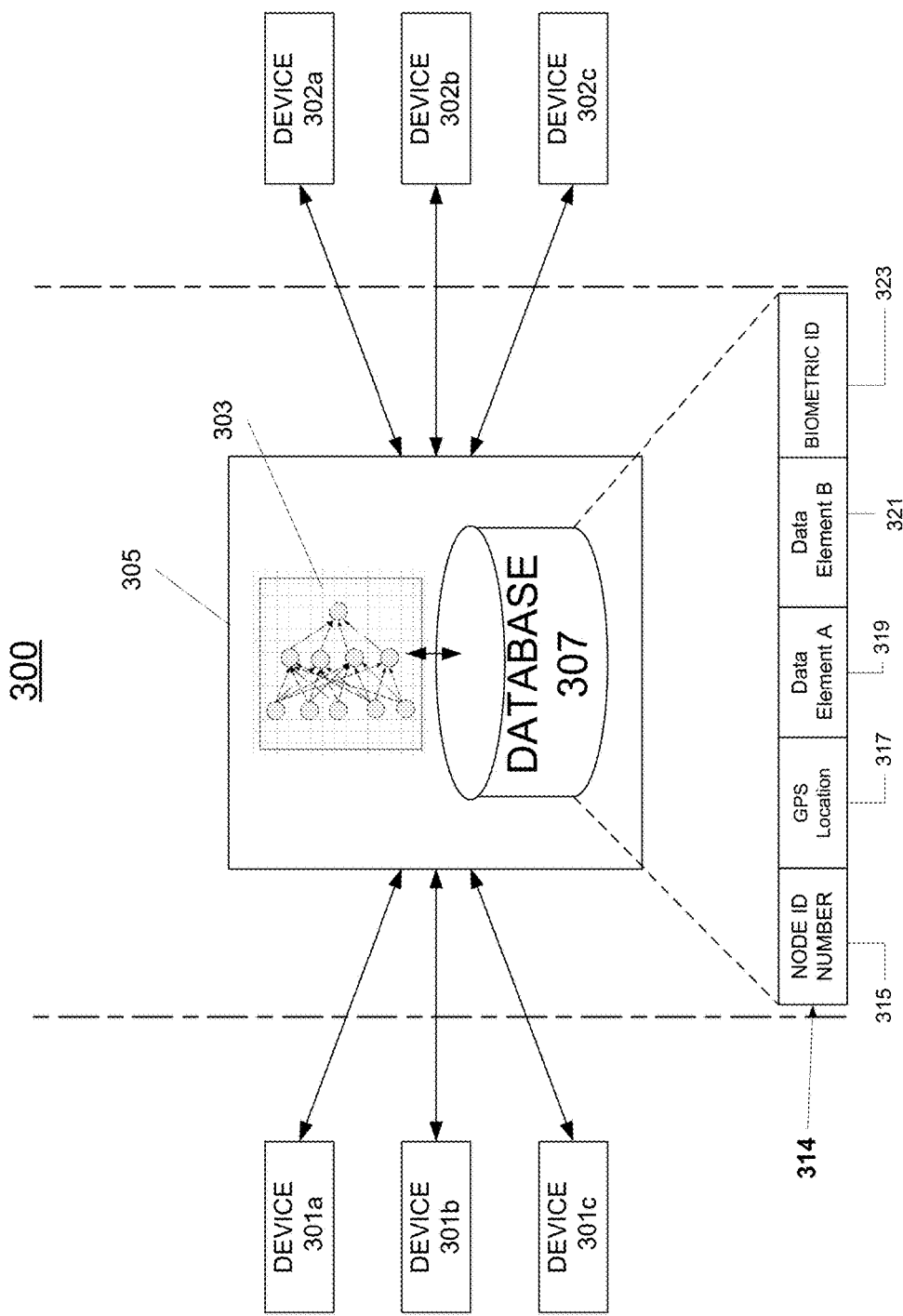
FIGS. 3A and 3B are an illustrative functional block diagram of workstations, database and servers that may be used to implement the processes and functions of certain embodiments.
Figure 3B:
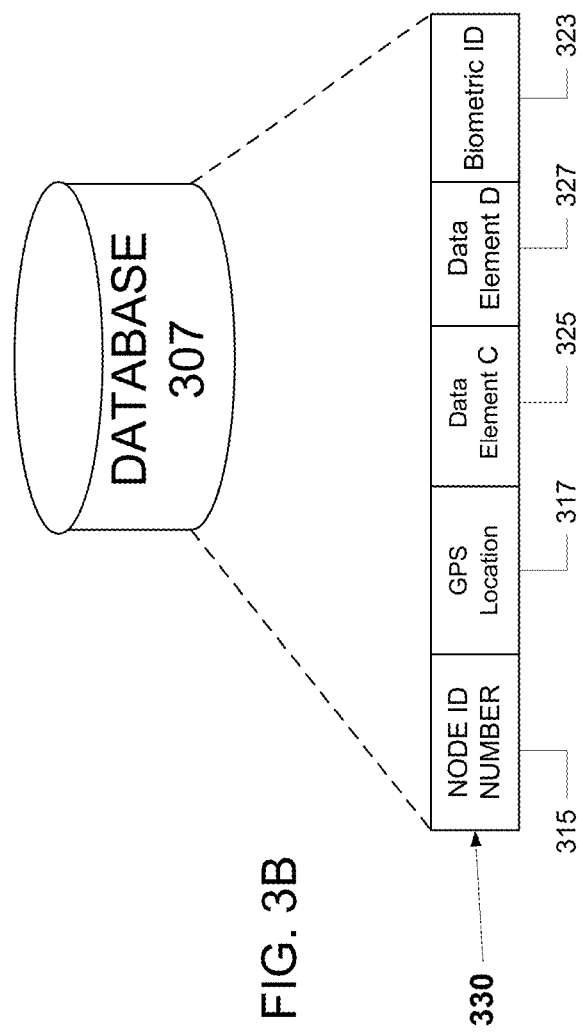
Figure 3C:
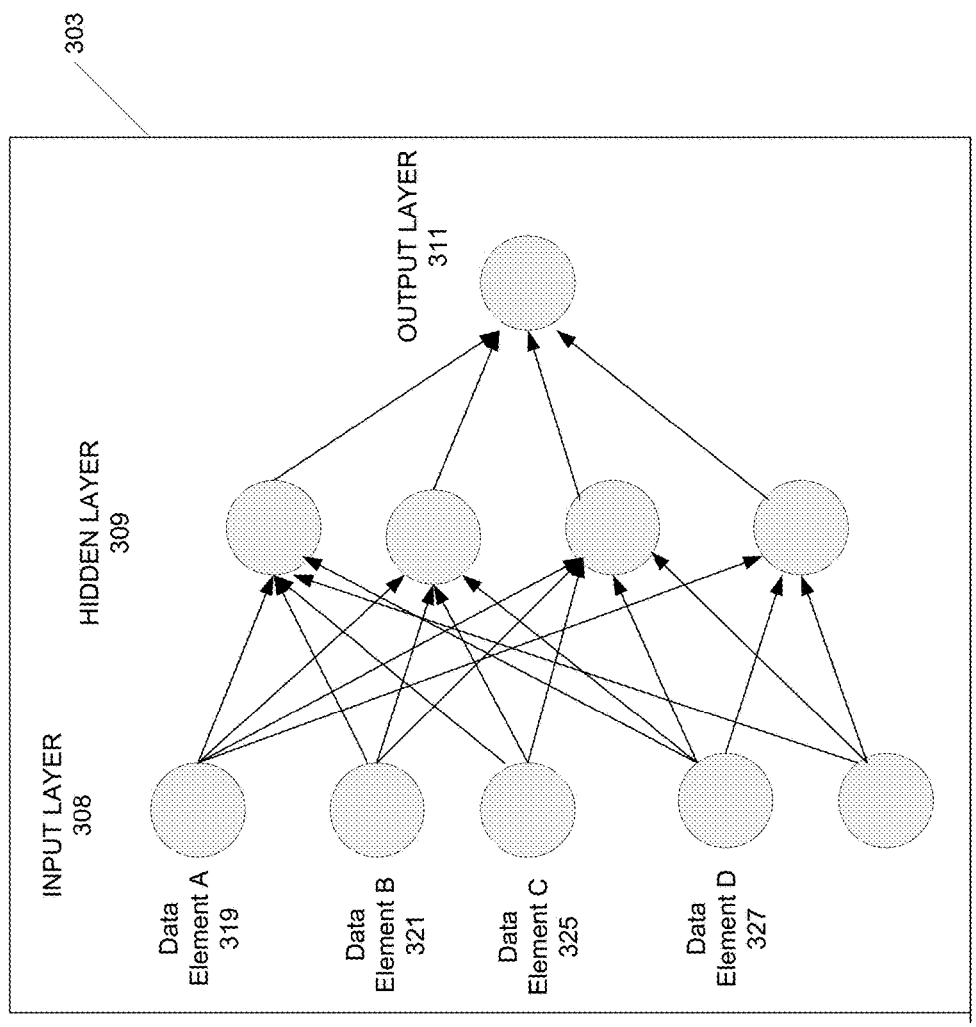
FIG. 3C is an illustrative functional block diagram of a neural network that may be used to implement the processes and functions of certain embodiments.

FIG. 3A-3C illustrate an example of representative infrastructure according to some embodiments in the disclosure. The different user devices 301$a$-301$c$, via terminals/workstations, electronically communicates with a plurality of different user devices 302$a$-302$c$, through the cloud-based neutral network processing system 300 including computer network 203, server 305 and electronic database 307. Cloud-based neutral network system 300 may incorporate various neutral network 303 features of available Tensorflow or Neuroph platforms as APIs, etc. In one embodiment, users execute commands with terminals/workstations to exchange information with the processing system 300 such that the identity of the users are shielded from each other. These terminals may be standard personal computers as are known in the art. In alternative embodiments, the users may use hand-held, tablet computers or other portable electronic devices, such as smart phones or wearable device, as known in the art to communicate with the system 300.

The system 300 includes, for example and without limitation, server 305. Server 305 may include a messaging server, which may be used to receive and send data via email or over the Internet 131. The system 300 may use various attribute data in the Electronic Data Interchange (EDI) format for electronic tracking of specific data as discussed in the foregoing. Server 305 can process an EDI messages sent through the processing system 300 to improve computer processing and machine learning functionality to thereby bring new tangible improved functions to the technology area of automatic AI recommendation to the user of device 501 based on GPS location and other data. A user with device 301$a$-301$c$ and 302$a$-302$c$ may securely register to system 300 via a website URL registration service, an in-person registration service, a mail-in registration service, and/or some other registration service. A biometric device system may be included to allow for scanning of an iris of the user, retina scan, face recognition, and/or other types of biometric identification and authentication, including fingerprint scan analysis.

FIGS. 3A-3C are merely illustrative and the number of, users and/or user terminals, servers and databases is not in any way limited. Furthermore, although various embodiments are described in the context of a single system, one of ordinary skill in the art may appreciate that the described functionality may be implemented across multiple systems. Moreover, a web site may be mirrored at additional systems in the network and, if desired, one or more management systems or other computer resources may be used to facilitate various functions. The computer program at the system 300 includes appropriate screen routines for generating a set of screens that together comprise a graphical user interface for the site.

The system 300 can provide messages in the communication cycle in an authenticated format, secure for each user that would be invited or authorized to be a part of the secure exchange. For example, an IPSEC circuit is commonly to pertain to IP Security, a set of protocols to support secure exchange of packet at the IP layer in a TCP/IP network system. IPSEC systems have been deployed widely to implement Virtual Private Networks (VPNs). Under an IPSEC system, at least two encryption modes are supported: Transport and Tunnel. Transport mode encrypts only the payload portion of each packet, but leaves the header. The Tunnel mode encrypts both the header and the payload. On the receiving side, an IPSEC-compliant device decrypts each packet. The methods and features recited herein further may be implemented through any number of non-transitory computer readable media that are able to store computer readable instructions. Examples of non-transitory computer readable media that may be used include RAM, ROM, EEPROM, flash memory or other memory technology, CD-ROM, DVD, or other optical disc storage, magnetic cassettes, magnetic tape, magnetic storage and the like.

Figure 4:
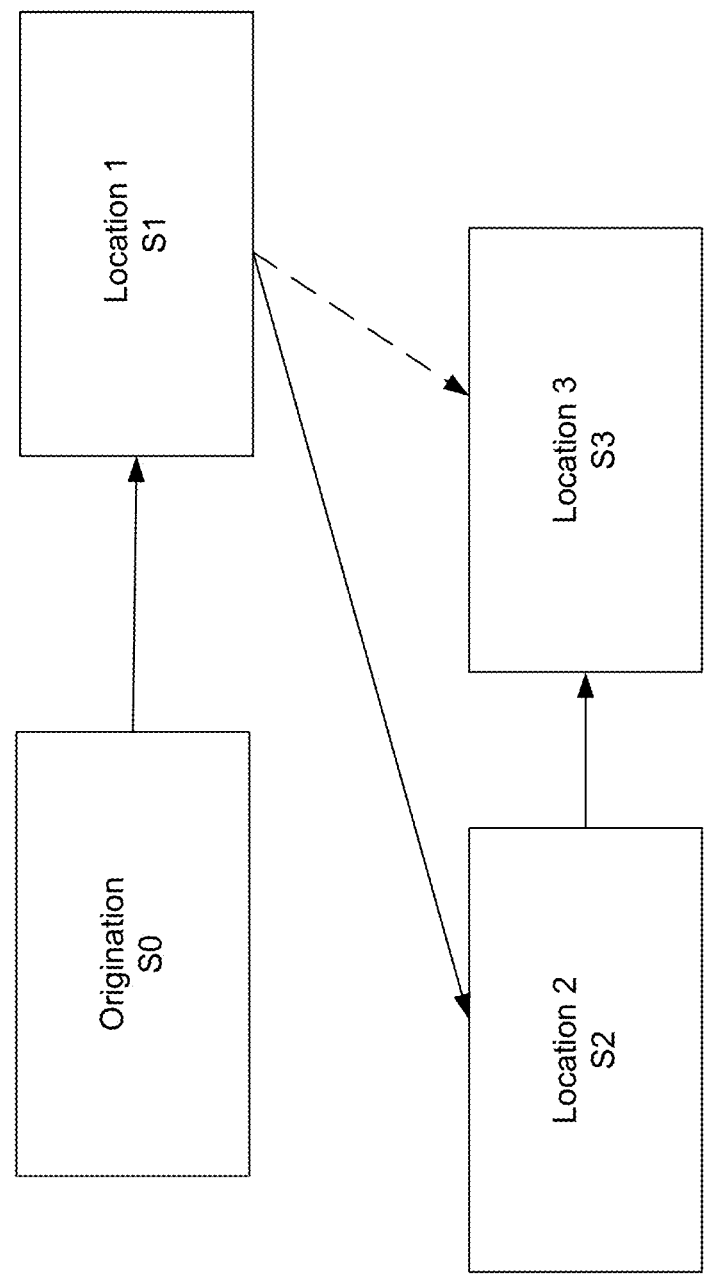
FIG. 4 is an example flow chart of an illustrative method for in accordance with at least one aspect of the present disclosure.
Figure 5:
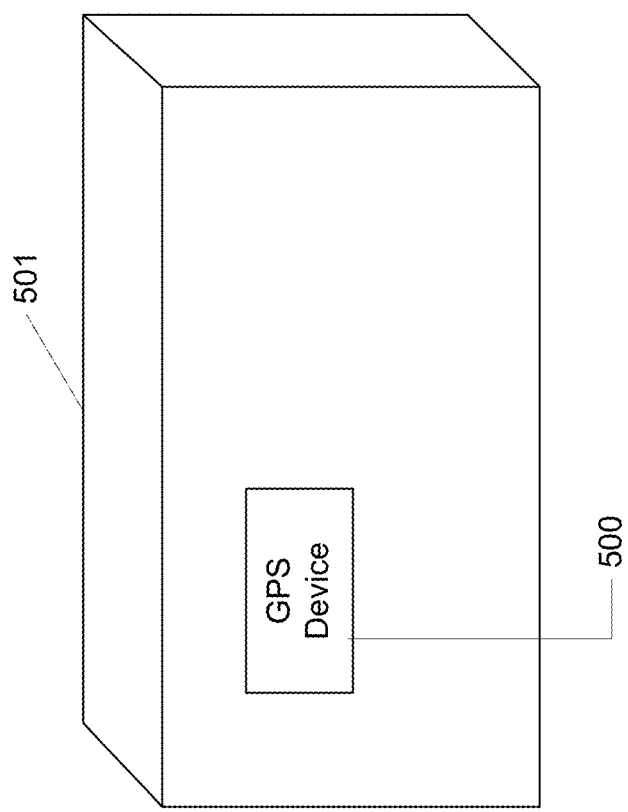
FIG. 5 is a schematic diagram of a mobile computing device with a GPS device in accordance with at least one aspect of the present disclosure.

According to some aspects of the disclosure, a machine learning neural network processing system 300 provides various users efficiency data communication tracking and delivery of a neural network recommendations based on data obtained from the GPS location of device 501 (see FIG. 5). Device 501 may include a global position system device/electronics 500 providing mapping coordinates. In one construction, the machine learning system 300 provides electronic messaging back and forth that inputs requests for selective location data retrieved from the GPS device (see FIG. 4).

Referring to FIGS. 3A and 3B, in one aspect, system 300 may use various attribute data in the Electronic Data Interchange (EDI) format. In one implementation, the EDI message can use, for example, IPSEC circuitry for secure encrypted communications. The EDI messages can be electronically processed according any number of formats and data sequences. In one case, the EDI format and payload, may include an neural net node ID number 315, a GPS attribute 317, a data element A attribute 319, and a data element B attribute data 321, and biometric data attribute data 323. The attribute data 317 pertains to a determined location, such as Locations 1 through 3 in FIG. 4. Biometric ID data attribute data 323 pertains to user biometric information. The GPS location associated with GPS attribute 323 may have at least the longitude and latitude of the location to linked to a mapping application. In the EDI format and payload, the "attribute data" may include ASCII characters in computer readable form or binary complied data, such as biometric data. The ASCII characters or binary data can be manipulated in the software of system 300. In one construction, a temporary virtual node with virtual sub-nodes may be electronically linked to the node ID attribute 315. Referring to FIG. 3C, neural network 303 is generally arranged in "layers" of node processing units serving as simulated neutrons, such that there is an input layer 308, representing the input fields into the network. To provide the automated machine learning processing, one or more hidden layers 309 with machine learning rule sets processes the input data. An output layer 311 provides the result of the processing of the network data.

The steps that follow in the FIG. 4 may be implemented by one or more of the components in FIGS. 1, 2 and 3A-3B and/or other components, including other computing devices. Referring to FIG. 4, in a general overview, system 300 electronically maintains a plurality of electronic nodes for users associated in a computer readable electronic database 121. In such an example, the separate node data 314 may be stored within a non-transitory computer readable memory/database, such as memory 115 and/or RAM 105 in FIG. 1 or electronic database 307 of FIGS. 3A-3B. A user with device 301a-301c electronically communicates with system 300 and devices 302a-302c via system 300.

The steps that follow in FIG. 4 can be implemented to include a computer readable transaction history or log of the status within process flows that can be maintained or otherwise stored within a memory/database, such as memory 115 and/or RAM 105 in FIG. 1 or electronic database 307 of FIGS. 3A-3C. In one construction, the steps that follow in the FIG. 4 can be implemented where the vendor, customer or other entity can receive inquiries, via an automatic push notification or a report that sends to the authorized inquirer an electronic mail, text messaging via Short Messaging Service (SMS) component of phone, web, or mobile communication systems, using standardized communication protocols that allow the exchange of short text messages between fixed line or mobile phone devices. In another manner, the customer or entities can receive inquiries via a pull format where the inquirer initiates the query at various steps and the notification can be electronic mail or Short Messaging Service technology for cellular phones.

Referring to FIG. 4 process flow of system 300, the various items in Steps S0-S3, are electronic logically via computer readable instructions linked to electronic attribute data for EDI message processing via system 300. A user travels with device 501 and communicates with processing system 300 as discussed in the foregoing. The system 300 may then employ selective attribute data in the Electronic Data Interchange (EDI) format to form a tokenized data form of transfer. For example, in Step S0, a temporary virtual node 314 is created in the memory/database 307 with at least one node ID number 315, and GPS location attribute 317, a data element A attribute 319, a data element B attribute 321 and a biometric ID attribute 323 of the user can be optionally provided in the temporary virtual node 314. In one example at location S0, data element A 319, data element B 321 can be associated with a data of a recent physical acquisition of an article of manufacture linked to the GPS location (e.g., a grocery store). Alternatively, data element A 319, data element B 321 can be associated with a data of recent product or transaction linked to the GPS location (e.g., bank location).

In Step S1, the device 501 has arrived at Location 1. Referring to FIG. 3B, a temporary virtual node 330 is created in the memory/database 307 with at least one node ID number 330, and GPS location attribute 317, a data element C attribute 325, a data element D attribute 327 and a biometric ID attribute 323 of the user can be optionally provided in the temporary virtual node 330. In one example at Location 1, data element C 325, data element B 327 can be associated with data linked to the GPS location (e.g., medical facility). Alternatively, data element A 319, data element B 321 can be associated with a data of recent product purchase linked to the GPS location (e.g. auto dealer). Likewise, in Steps S2 and S3 as the device 502 moves from Location 2 to Location 3, a temporary a unique virtual node is created in the memory/database 307 with at least one node number, and a GPS location attribute, different data element attributes are stored for later use in the neural network 303. As noted, device 501 moves between various locations and the data elements created at the nodes may be provided to neural network 303 to provide machine learning based recommendations. For example, device 501 could travel from Location 1 directly to Location 3. Likewise, device 501 can travel directly to Location 2 or Location 3.

Figure 7:
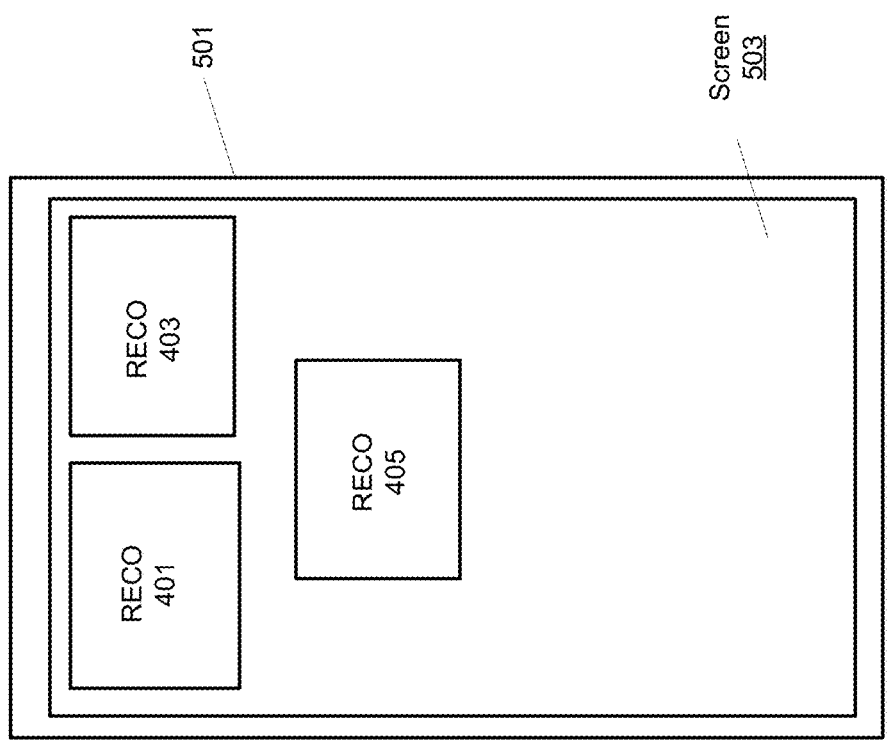
FIG. 7 is an example block diagram of an illustrative mobile device providing for secure AI-based information on screen display in accordance with at least one aspect of the present disclosure.

Referring to FIG. 3C, data element A attribute 317, data element B attribute 319, data element C attribute 325, data element D attribute 327, serves as input data into input layer 308, representing the input fields into the neural network 303. To provide the automated learning processing, one or more hidden layers 309 with machine learning rule sets processes the noted input data associated with data elements A-D. The output layer 311 provides the result of the processing of the network data to the user device 501. Referring to FIG. 7, in the output layer 311 can provide various alternative one or more recommendations based on data elements A-D and the recommendations RECO 401-403 can be converted into graphical screen display characters or images for use on device 501. It is contemplated that RECO 401-403 can be provided via an electronic mail, text messaging via Short Messaging Service (SMS) component of phone, web, or mobile communication systems, using standardized communication protocols that allow the exchange of short text messages between fixed line or mobile phone devices. The recommendations RECO 401-405 can be in the form of many types including navigation information to frequent terrestrial locations of the user of the device 501; similar or related article of manufacture information; similar or related services information; or health/wellness information, such as fitness facility locations, etc.

Figure 6:
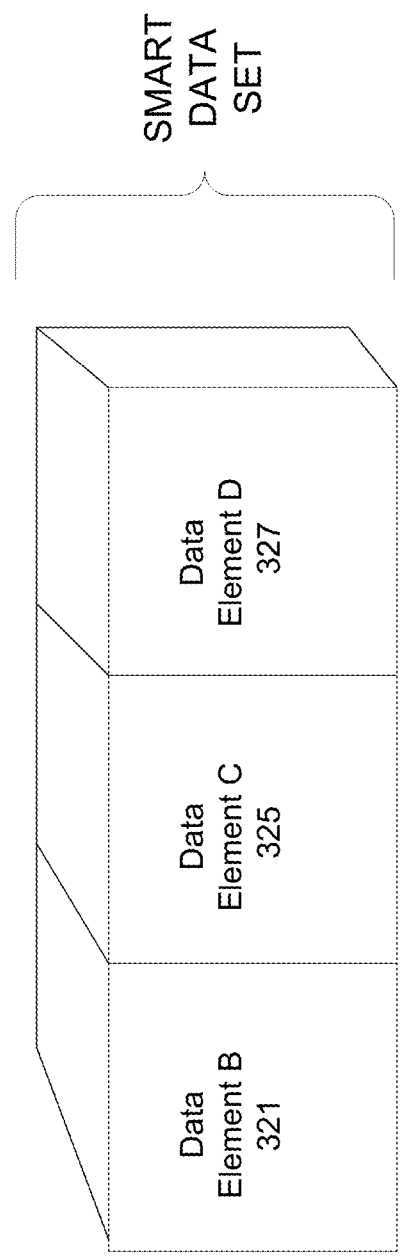
FIG. 6 is an example block diagram of an illustrative smart data set in accordance with at least one aspect of the present disclosure.

Referring to FIG. 6, in some embodiments, data elements A-D can be organized into a smart data set, such that the multiple numbers of nodes with GPS data can provide benefits to the users 301a-301c with device 501. For example, multiple nodes, which connect to more than a threshold number of nodes, can be determinative of which data elements to provide to the neural network 303 to provide a focused recommendation to the user, that is, noise data elements can be excluded for processing. In one case, certain nodes could be associated with a specific GPS location that has threshold number of nodes, while another GPS location node may be only one entry over a time period. The threshold number of nodes would most likely be representative of an activity or location of some frequent use by the user. The GPS data can be one method of a tagging characteristic to determine the threshold value or a frequent data element attribute value in data elements A-D can be another way of tagging. In the example of FIG. 6, the smart data set includes data element B attribute 319, data element C attribute 325, data element D attribute 327 which data element A attribute in the large set has been excluded.

Figure 8:
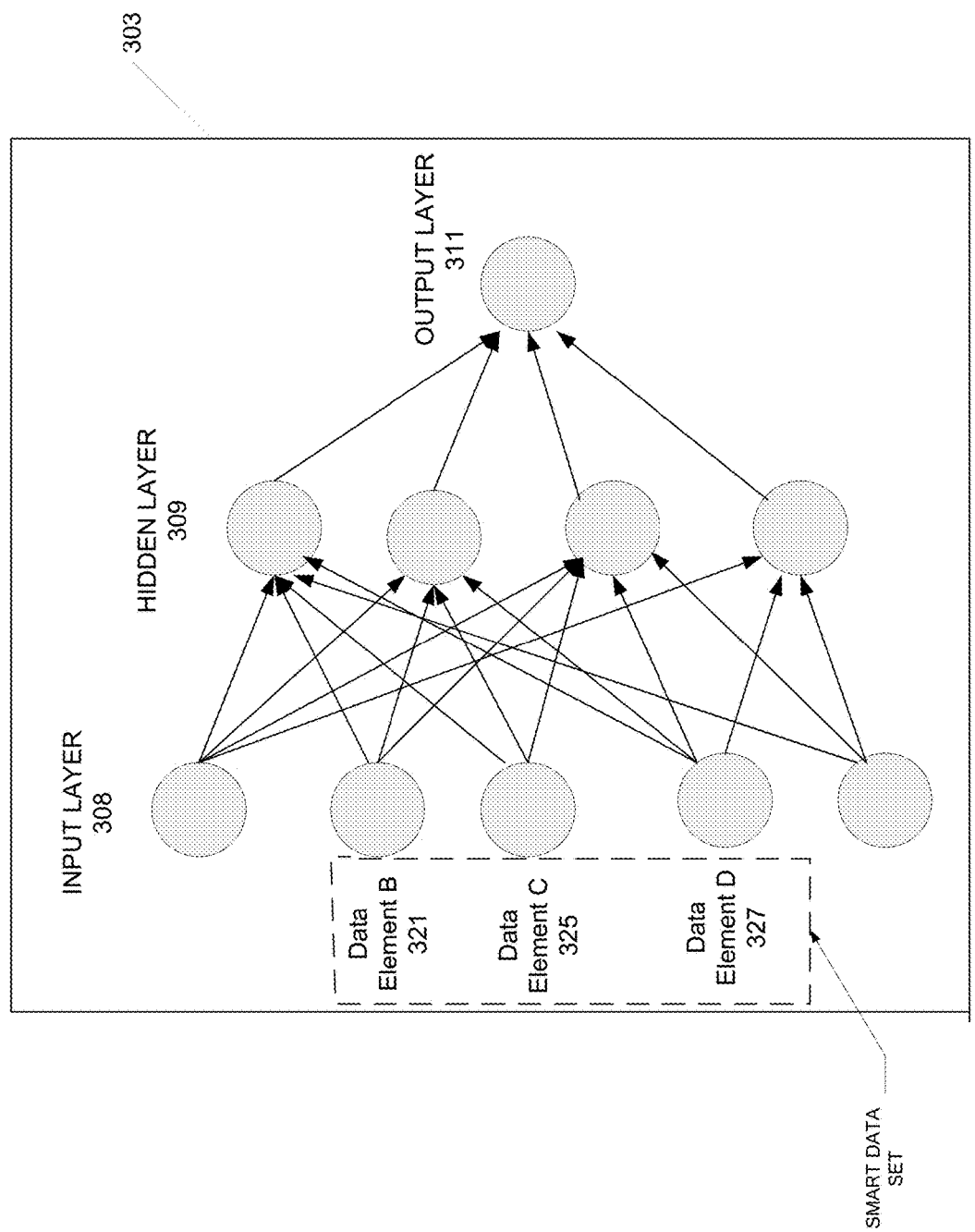
FIG. 8 is an illustrative functional block diagram of a neural network with smart data that may be used to implement the processes and functions of certain embodiments.

Referring to FIG. 8, data element B attribute 319, data element C attribute 325, data element D attribute 327, serves as input data into input layer 308, representing the input fields into the neural network 303. The output layer 311 provides the result of the processing of the network data to the user device 501. In this embodiment, referring to FIG. 7, in the output layer 311 can provide various alternative one or more recommendations based on data elements B-D and the recommendations RECO 401, 403 can be converted into graphical screen display characters or images for use on device 501. In this case, RECO 401, 403 has been provided due and not RECO 405 to illustrate that the smart data can provide enhanced recommendation output from neural network 303.

While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the elements of the aforementioned embodiments may be utilized alone or in combination or sub-combination with elements of the other embodiments. It will also be appreciated and understood that modifications may be made without departing from the true spirit and scope of the present disclosure. The description is thus to be regarded as illustrative instead of restrictive on the present disclosure.

The invention claimed is:

1. An electronic computer implemented method of data communication, comprising:
    via a computer-based network, receiving a plurality of virtual nodes with EDI data payload including a node attribute, a GPS location attribute and a biometric ID attribute and at least one data element associated with the GPS location attribute;
    electronically via a data communications network, processing the EDI data payloads including the node attribute, the GPS location attribute and the biometric ID attribute and the at least one data element associated with the GPS location attribute and outputting a subset of the EDI data payloads to define a smart data set;
    electronically processing the smart data set in a network with machine learning and providing an electronic message responsive thereto; and
    transmitting via an EDI data payload, the electronic message to a device associated with the biometric ID attribute.

2. One or more non-transitory computer readable media storing computer executable instructions that, when executed by at least one processor, cause the at least one processor to perform a data communication method, comprising:
    via a computer-based network, receiving a plurality of virtual nodes with EDI data payload including a node attribute, a GPS location attribute and a biometric ID attribute and at least one data element associated with the GPS location attribute;
    electronically via a data communications network, processing the EDI data payloads including the node attribute, the GPS location attribute and the biometric ID attribute and the at least one data element associated with the GPS location attribute and outputting a subset of the EDI data payloads to define a smart data set; and
    electronically processing the the smart data set in a network with machine learning and providing an electronic message responsive thereto; and
    transmitting via an EDI data payload, the electronic message to a device associated with the biometric ID attribute.

3. A digital computer system, comprising:
    at least one computer readable database configured to maintain a plurality of computer readable nodes; and
    at least one computing device, operatively connected to the at least one computer readable database, configured to:
        electronically receive a plurality of virtual nodes with EDI data payload including a node attribute, a GPS location attribute and a biometric ID attribute and at least one data element associated with the GPS location attribute;

electronically process the EDI data payloads including the node attribute, the GPS location attribute and the biometric ID attribute and the at least one data element associated with the GPS location attribute and output a subset of the EDI data payloads to define a smart data set;

electronically process the smart data set in a network with machine learning and providing an electronic message responsive thereto; and transmit via an EDI data payload, the electronic message to a device associated with the biometric ID attribute.

* * * * *